United States Patent [19]
Bennardo et al.

[11] Patent Number: 5,586,747
[45] Date of Patent: Dec. 24, 1996

[54] ADJUSTABLE SOLENOID VALVE WITH IMPROVED STABILITY

[75] Inventors: Gilbert Bennardo, Nice; Aimé Goubely, La Trinité, both of France

[73] Assignee: Eaton Corporation, Cleveland, Ohio

[21] Appl. No.: 355,386

[22] Filed: Dec. 13, 1994

[51] Int. Cl.⁶ .................................................. F16K 31/06
[52] U.S. Cl. ............................... 251/129.18; 335/258
[58] Field of Search ...................... 251/129.18; 335/258, 335/273

[56] References Cited

U.S. PATENT DOCUMENTS

| | | | |
|---|---|---|---|
| 3,684,238 | 8/1972 | Michelle et al. | 251/129.07 |
| 3,707,992 | 1/1973 | Ellison et al. | 251/282 |
| 4,917,351 | 4/1990 | Lindbloom et al. | 251/129.18 |

FOREIGN PATENT DOCUMENTS

| | | | |
|---|---|---|---|
| 477091 | 9/1951 | Canada | 251/129.02 |
| 144326 | 9/1980 | German Dem. Rep. | 335/258 |

Primary Examiner—Stephen M. Hepperle
Attorney, Agent, or Firm—Roger A. Johnston

[57] ABSTRACT

The invention features, (i) a fan-shaped or otherwise axially deformable washer structure (4D) between a screwed element (5,5A) and a valve body member or coil jacket (3); (ii) a conical preferably self-tapping or self-cutting, a fine, screw thread (8) moving with the element; (iii) a thin valve carcass which may be distorted or even broken by normal screw-in pressures encountered, or by heating-up effects; (iv) the washer forming part of or being integral with the magnetic circuit of the solenoid; (v) a return spring (7A) in the gap (7), between the two armature parts (5,6) e.g., lodged in recesses in the adjacent faces thereof; and (vi) an annular recess (9) in the periphery of the "fixed" armature part (5), to accommodate an O-ring, if satisfactory fluid sealing should require it; also a further axial interval (10) to accommodate a certain freedom of screw-in.

16 Claims, 3 Drawing Sheets

ADJUSTABLE SOLENOID VALVE WITH IMPROVED STABILITY

BACKGROUND OF THE INVENTION

The present invention relates to a solenoid valve of the type having an armature of two generally rod-like parts, of which only one part moves during solenoid energization and de-energization, to open and close a fluid port or path. For extreme sensitivity and quick response, a return bias or spring, the magnetic characteristics and the axial gap between the two parts of the armature have to be carefully and precisely selected. The valve can be the two-port open or shut type, or a 3/2 type where a common port can be connected to one of two others.

A primary object of the valve of the invention is to provide adjustability in the suspension of a vehicle whenever the gravity loading of the vehicle is altered, e.g., from one to five passengers, perhaps with some, or much luggage. Usually it will be set at the beginning of a journey. Alternatively, for use in level setting of a vehicle suspension, quick reaction, sensitivity and repeatability may often be significant, because it is often desirable that the suspension activity respond to road surface to become harder or softer. The valve should be able to be pulsed open and shut rapidly in order to pump a pneumatic suspension up or down e.g., with air at high pressure. If large unknown electrical currents are required, to open the fluid path, whether gas or liquid, or indeed to close a normally open path, rapid responses would not be possible.

It is desirable therefore that the armature gap between the two parts be easy to adjust, but once adjusted manually, to keep its gap adjustment with acceptably improved sensitivity.

SUMMARY OF THE INVENTION

One part of the two part armature moves when the valve is commanded open or shut, while the other part is relatively "fixed" during solenoid operation, but can be adjusted by screwing, to preset the starting gap, i.e., the gap when the solenoid is not energized. Vibrations either due to valve operation or the movements of the suspension, vehicle etc or other environmental disturbances, tends sooner or later to disturb preset parameters such as axial armature gaps or to move the solenoid coil.

The invention proposes to take advantage of the following: firstly the radially holding effect of a surrounding coil, which allows thinner and more distortable material to be satisfactorily used for the valve body. Secondly the thinner material increases magnetic sensitivity by reducing radial magnetic gaps. Thirdly the thinner material allows the use of a tapering, conical or self-tapping screw thread to be used, for stable, gently distorting manual adjustments. The electromagnetic stability and ease of manual presetting are highly significant in such uses of the valve where rapid, even repeated or successive flow path open/shut cycling may be of paramount importance.

The invention may feature, (i) a fan-shaped or otherwise axially deformable washer structure (4D) between a screwed element (5,5A) and a valve body member or coil jacket (3); (ii) a conical preferably self-tapping or self-cutting, a fine, screw thread (8) moving with the element; (iii) a thin valve carcass which may be distorted or even broken by normal screw-in pressures encountered, or by heating-up effects; (iv) the washer forming part of or being integral with the magnetic circuit of the solenoid; (v) a return spring (7A) in the gap (7), between the two armature parts (5,6) e.g., lodged in recesses in the adjacent faces thereof; and (vi) if necessary, an annular recess (9) in the periphery of the "fixed" armature part (5), to accommodate an O-ring, if satisfactory fluid sealing should require it; also a further axial interval (10) to accommodate a certain freedom of screw-in.

DETAILED DESCRIPTION

Figure 1:
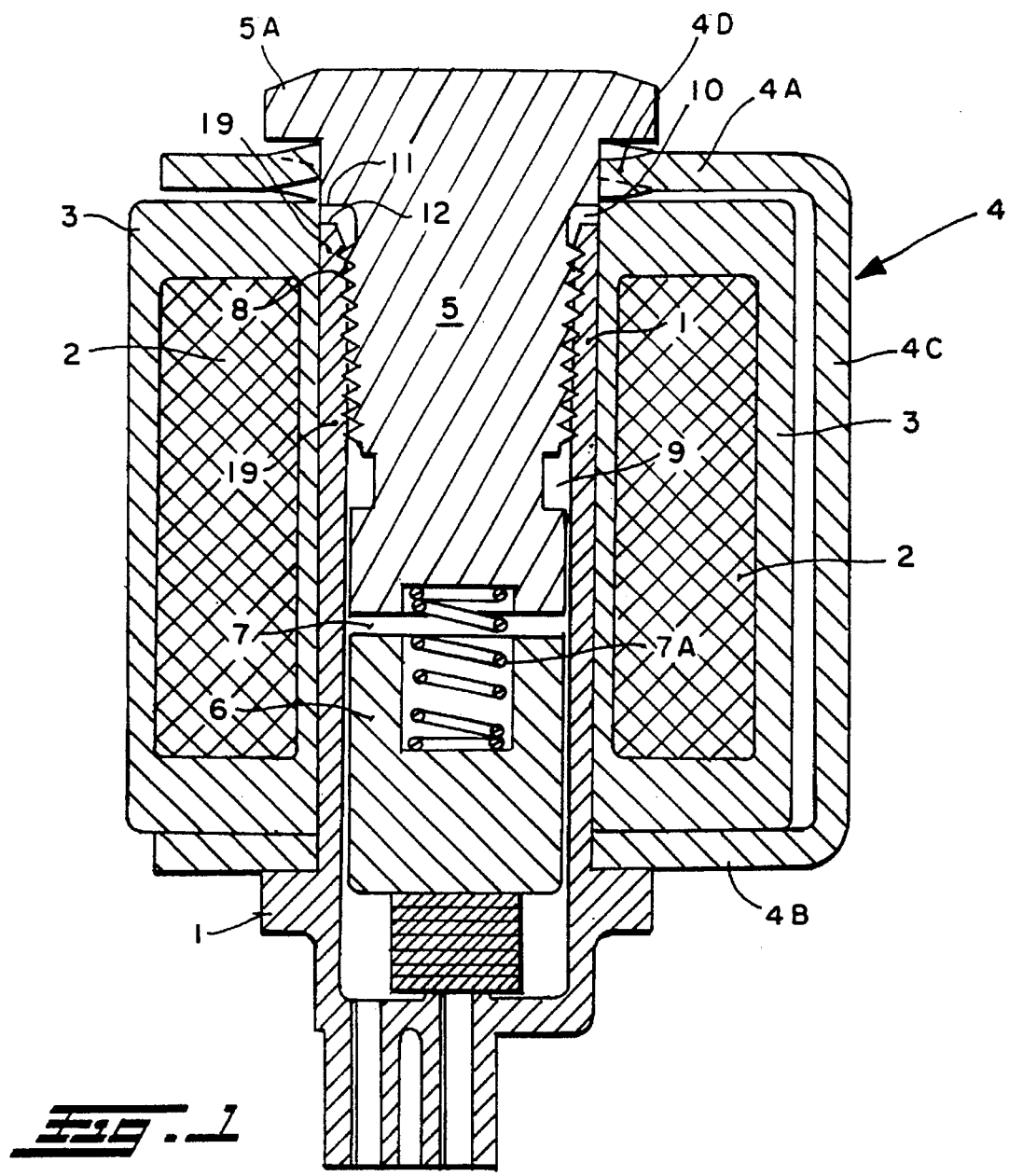
FIG. 1 is a diametrical section on a cylindrical solenoid valve, having an axial, two-part armature.

Referring to the drawings, the solenoid valve shown has a thin plastics tubular body portion 1 surrounded by an electromagnetic coil 2 which is enclosed in a plastics jacket 3, also thin. The coil 2 is wound to be in a tension and presses all round inwards on the jacket 3 and body portion 1.

The coil when energized magnetizes a circuit consisting of the top 4A of an outer jacket 4 (see also FIG. 2), a fixed armature portion 5 adjustable axially in the body portion 1, a moving armature portion 6 which is driven upwards (as illustrated) by the coil when energized, the bottom 4B of the outer jacket, and the cylindrical outer side 4C thereof.

The top 4A of the outer jacket is apertured at 4D in a fan-shaped, sawtoothed or other readily axially deformable manner. It is therefore enabled to be easily resiliently compressible, or at least axially and progressibly distortable, between a screw-head portion 5A of the "fixed" armature 5, and the top 4A of the magnetic outer jacket 4.

Thus an axial gap 7 between the two armature parts 5 and 6 can be adjusted by a screwing in or out of the screw-head portion 5a. As is well known, the magnetic reluctance of the circuit (and hence the valve characteristics such a response to energization) is very sensitive to variations in this gap 7 between the permeable parts 5 and 6.

As the fixed armature is first screwed in, against bias of e.g., a coil spring 7A lodged in recesses 7B in the armature faces, a fine conical thread 8 thereon forms a new thread 19 in the body portion 1, preferably by a pressing action tending to distort or bow this body portion outwards. The finer the thread, the better the flow in forming the thread in the valve body. Also the adjustability in the final product is more sensitive. The threaded portion may be tapered or shaped otherwise than conical, e.g., with flutes, or conical with flutes to assist the thread cutting process. In general, if the free end of the threaded part is not of smaller diameter, it will not enter the valve body to be threaded.

The resulting threaded engagement has no perceptible play, whatever the adjustment set for the "fixed" armature portion 5. Therefore the magnetic gap 7, the axial dimension of which greatly influences the characteristics and responses of the valve, can be selected or varied, so that the latter can be guaranteed within a close range. Moreover, the characteristics can be predictably and precisely changed, by screwing the fixed armature portion 5 in or out, towards or away from the mobile armature portion in cooperation with a bias spring 7A tending to push the armature parts apart.

It may be necessary to choose the thickness of the wire for the coil 2, usually of copper, not only to have adequate gauge for the valve-energizing current which has to be passed, but also in accordance with the tension required, to press adequately inwards against the radially outward force exerted by the tightly engaged screw threads.

A peripheral groove 9 may be present on the fixed armature to accompany a sealing O-ring or the like, and preferably some form of further axial interval 10 is located on the fixed armature just above the screw thread therein. This interval is provided by taking in the diameter of the head portion of the fixed armature to leave a radial annular surface 11. The interval should be sufficient to allow the fixed armature to be screwed in against the spring 7A as far as necessary to zero or to acceptably minimize the gap between the armature portions, without the surface 11 coming into abutment at 12 with the plastics body portion 1 of the valve.

The fan form or other shaping of the aperture 4D serves firstly to allow compressing of the coil progressively, which counters axially the effects due to the radial outward force caused by engagement of the threads; secondly, to take up free play thus avoiding unpredictable movements of the threaded engagement; thirdly to allow better magnetic contact between the apertured jacket and the armature which may be significant since this contact is a series element in the magnetic circuit; and fourthly it also prevents the whole coil moving axially which can be quite audible even objectionably noisy. The fan shaping can be replaced by a separate e.g., wave spring washer. Use of the fan shaping on the aperture or of a wave spring enables axial retaining pressure on the coil, whatever the state (within limits) of the screwed adjustment, and so there is less risk of the coil vibrating axially and failing, or generating noise.

Accordingly without a greater number of separate parts, a compact solenoid valve allows precise presetting or adjustments of- its characteristics, to be stable with time, and resistant to vibration, and repeatable between different samples.

Alternatives readily occurring to the skilled person include the following. The coil jacket or carcass 4 may be, as well known, molded over the coil 2. It is preferred, not to have a thread or partial thread 19 already in the valve body, before the first fitting engagement of the fixed armature. This preference is because a body without thread is easier to mould. Also an internal thread already on the valve body can damage or destroy the O-ring during its assembly to position 9. The first threading may be carried out while energizing current is being applied to the coil, and a current or voltage or other electrical parameter observed while screwing in the fixed armature. An alternative possibility is that the screwing-in may be stopped immediately after a selected voltage such as 8 volts applied to the coil opens the diaphragm. In factory production, tolerance of spring, armature, coil, coil body are all compensated for by use of the axially resilient shaping 4D or separate washer thread, axially holding the coil as aforementioned.

Figure 2:
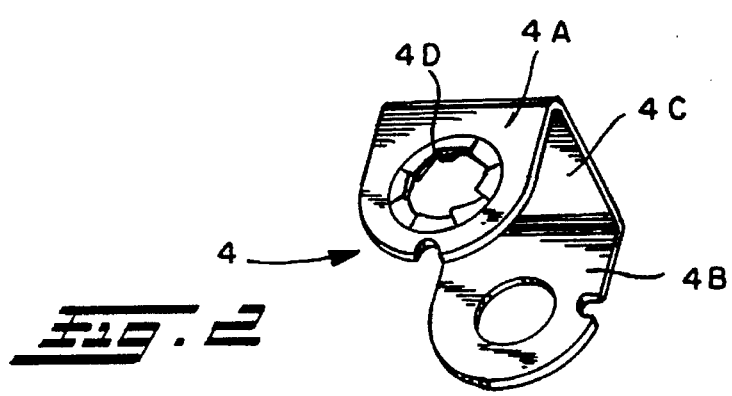
FIG. 2 is a perspective on a magnetic circuit detail of FIG. 1.
Figure 3:
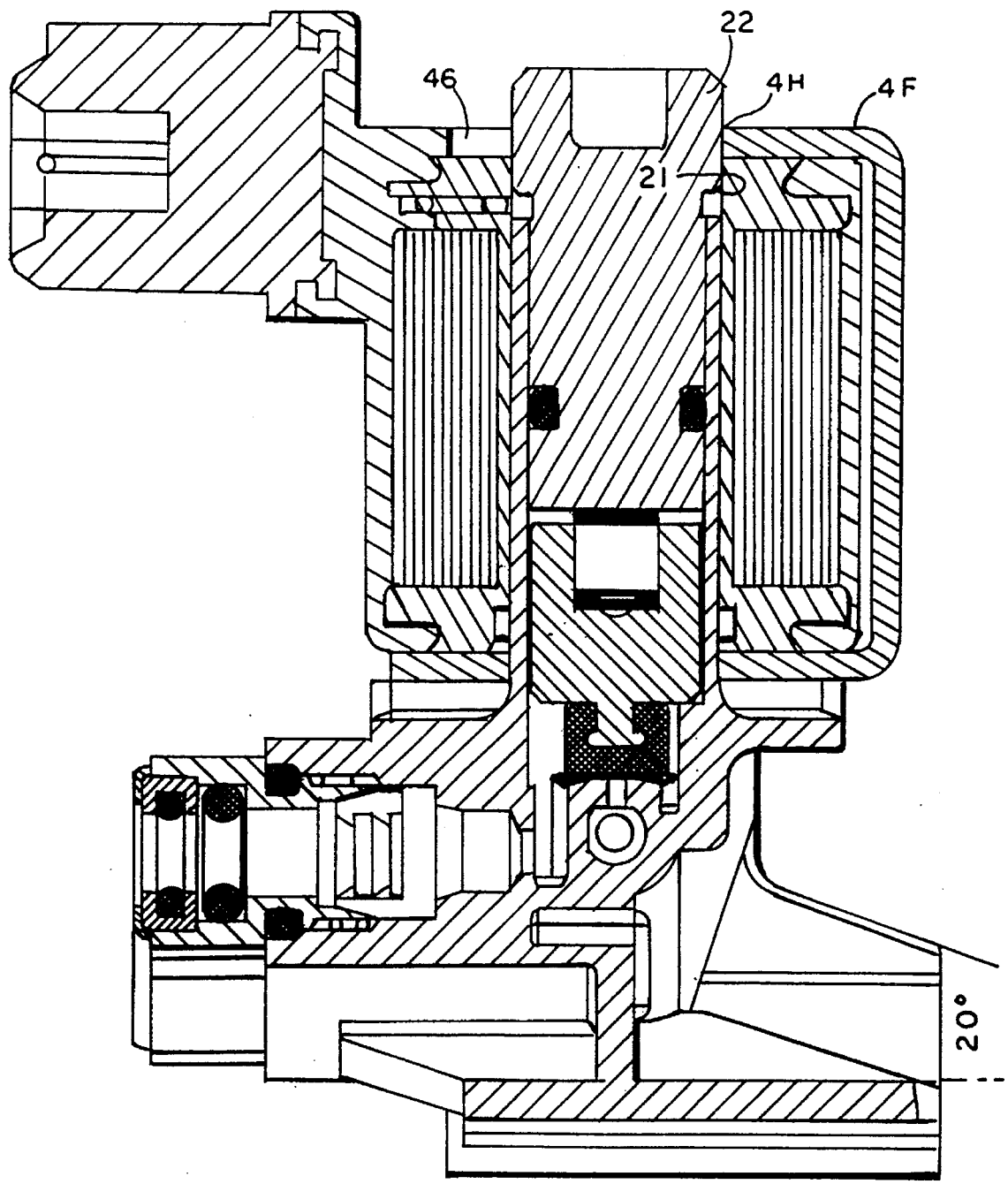
FIG. 3 is a diametrical section on a solenoid valve slightly different from that of FIG. 1.
Figure 4:
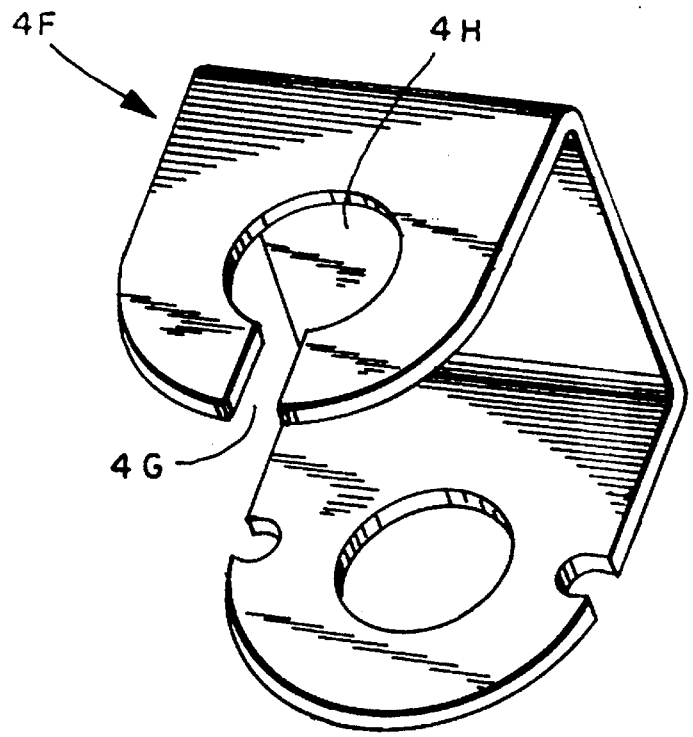
FIG. 4 shows perspectively an alternative magnetic circuit portion.
Figure 5:
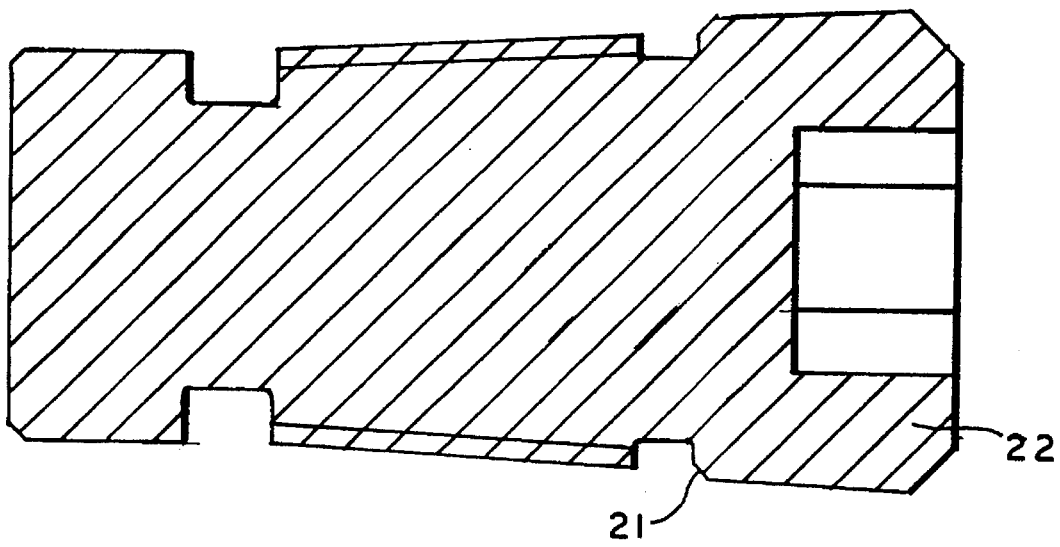
FIG. 5 shows an alternative fixed armature, in axial section.

Further alternatives will occur to the skilled man; for instance there may be no fan shaping of the aperture shown at 4D in the magnetic circuit of FIGS. 1 and 2. Instead, as can be seen at slot 4G in FIGS. 3 and 4, the aperture 4H is opened radially, so that 4G and 4H together resemble a keyhole. The head 22 of the fixed armature 23 is no longer radially projecting, as shown at 5A in FIG. 1, but is only slightly larger in radius than is hole 4H in the magnetic circuit, just large enough to distort the circuit 4F very slightly. This alternative has the advantage that the adjustable travel may be greater without requiring such an increase in torque to screw in the fixed armature and to compress the flutings or fan-shaping 4D of FIG 1. There will still be effective resistance to unscrewing or vibration, due to this and due to the tapered thread, as before. The magnetic contact at the edge of aperture 4H is believed superior, to that of FIG. 1.

The head 22 of the fixed armature may also be tapered or 450 conical at 21, in order to enter aperture 4H gradually widening it, and widening slot 4G, without brusque stresses. It will also be noted in FIG. 3, that there is no magnetic gap under the fixed armature head 22, as was inevitable under head 5A in FIG 1 (unless heavy torque is used and the head is screwed right in).

Although the present invention has been described hereinabove with respect to the illustrated embodiments, it will be understood that the invention is capable of modification and variation and is limited only by the scope of the following claims.

We claim:

1. A solenoid valve having preset manual adjustability of a first (5) armature part relative to the valve body and a second armature part (6) driven by the solenoid relative to the valve body, the parts being separated by a gap (7), characterized by a self-cutting or self-tapping thread (8) moving with the first armature part (5) and adapted to engage a valve body portion (1), thereby presetting said gap (7); wherein said first armature part is characterized by a self tapping threaded portion and a portion of reduced transverse dimension that is free from contact with said valve body portion.

2. Solenoid valve according to claim 1 in which the region of self tapping engagement at least overlaps axially with a region of the valve body pressed radially by the solenoid coil (2).

3. A solenoid valve according to claim 1 in which a magnetic member (4D,4F) of the circuit or a radial gap (4G) thereof is distorted axially by the presetting movements of the armature.

4. A solenoid valve according to claim 3 in which the distortion is resilient and tends to press axially on the solenoid coil (2).

5. A solenoid valve according to claim 1 in which the valve body portion (1) is distorted by the self-tapping engagement, particularly and the said self-cutting thread (8) is conical.

6. A solenoid valve according to claim 1 having a limiting axial interval (10), to limit the reduction in gap size (7) produced by the presetting.

7. An electromagnetically operated valve assembly comprising:

(a) body means defining an inlet, an outlet and a valving chamber having a valve member moveable between a first and second position therein for controlling flow between the inlet and outlet, said valve member having at least a portion thereof formed of material of relatively high magnetic permeability, said body means defining a generally thin walled portion surrounding said valve member, and forming a portion of said valving chamber;

(b) a stationary ferromagnetic pole piece disposed within said valving chamber and defining an air gap with respect to said valve member in said first position wherein said pole piece is accessible externally and includes means for adjusting said air gap wherein said valve member in said first position is characterized by a self tapping threaded portion and a portion of reduced transverse direction that is free from contact from said valve body portion;

(c) a coil of electrically conductive material disposed about said thin-walled portion of said body means;

(d) a pole frame completing a magnetic loop with said coil and said pole piece;

(e) means providing fluid pressure sealing between said pole piece and said body means wherein said sealing means accommodates said adjustment of said air gap.

8. The valve assembly defined in claim 7, wherein said means providing fluid pressure sealing includes tapered threads on said pole piece.

9. The valve assembly defined in claim 7, wherein said pole piece threadedly engages said thin walled portion and said means providing fluid pressure sealing includes an annular resilient seal.

10. The valve assembly defined in claim 7, wherein said valving chamber includes a valve seat and said valve member is closed against said valve seat in said second position.

11. The valve assembly defined in claim 7, wherein said valve member includes a nonmagnetic member attached to a magnetically permeable member.

12. A solenoid valve according to claim 1 wherein said valve body portion (1) is plastic.

13. The valve assembly defined in claim 7 wherein said body means is plastic.

14. The method of making a solenoid operated valve assembly comprising:

(a) molding a valve body having an inlet, outlet and a valving chamber having a relatively thin walled tubular portion;

(b) disposing an electrical coil about said tubular portion and disposing a moveable armature slidably in said tubular portion;

(c) self-tapping a stationary pole piece in said tubular portion and defining therebetween an air gap with said armature, wherein said stationary pole piece is characterized by a self tapping threaded portion and a portion of reduced transverse dimension that is free from contact with said valve body portion;

(d) accessing said pole piece externally from the end of said tubular portion and adjusting the self-tapping position of said pole piece and setting said air-gap.

15. The method according to claim 14 comprising shaping of the free end of the threaded part (21) to assist initial entering or centering towards threaded engagement.

16. A method according to claim 14 in which presetting is terminated when an observed electrical parameter attains a value.

* * * * *